United States Patent
Khoshnevisan et al.

(10) Patent No.: US 12,160,865 B2
(45) Date of Patent: Dec. 3, 2024

(54) ENHANCED PUCCH TRANSMISSION FOR REPETITION OR FREQUENCY HOPPING

(71) Applicant: QUALCOMM Incorporated, San Diego, CA (US)

(72) Inventors: Mostafa Khoshnevisan, San Diego, CA (US); Yitao Chen, San Marcos, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/534,541

(22) Filed: Dec. 8, 2023

(65) Prior Publication Data

US 2024/0129919 A1 Apr. 18, 2024

Related U.S. Application Data

(62) Division of application No. 17/406,659, filed on Aug. 19, 2021, now Pat. No. 11,902,977.

(Continued)

(51) Int. Cl.
*H04W 72/20* (2023.01)
*H04L 1/1812* (2023.01)
*H04L 5/00* (2006.01)

(52) U.S. Cl.
CPC .......... *H04W 72/20* (2023.01); *H04L 1/1812* (2013.01); *H04L 5/0098* (2013.01)

(58) Field of Classification Search
CPC .... H04W 72/20; H04L 1/1812; H04L 5/0098; H04L 1/1896; H04L 5/0094;

(Continued)

(56) References Cited

U.S. PATENT DOCUMENTS

2019/0141698 A1* 5/2019 Kim ................. H04L 5/001
2019/0313342 A1* 10/2019 Papasakellariou .... H04W 52/48

(Continued)

FOREIGN PATENT DOCUMENTS

WO 2021176418 A1 9/2021

OTHER PUBLICATIONS

Huawei, et al., "[H600]-[H603] Capturing the Updated L1 Parameters from RAN1#100bis-e", 3GPP Draft, 3GPP TSG-RAN WG2 Meeting #110 electronic, R2-2005478, 3rd Generation Partnership Project (3GPP), Mobile Competence Centre, 650, Route Des Lucioles, F-06921 Sophia-Antipolis Cedex, France, vol. RAN WG2, No. electronic, Jun. 1, 2020-Jun. 12, 2020 May 22, 2020 (May 22, 2020), XP051888805, 3 Pages, the whole document.

(Continued)

*Primary Examiner* — Abdullahi Ahmed
(74) *Attorney, Agent, or Firm* — Procopio, Cory, Hargreaves & Savitch LLP

(57) ABSTRACT

The apparatus receives a PUCCH resource configuration associated with a PUCCH resource. The PUCCH resource configuration indicates at least one of a PUCCH resource repetition configuration or a PUCCH resource inter-slot frequency hopping configuration for the PUCCH resource that is independent of PUCCH formats. In addition, the apparatus transmits a PUCCH in the PUCCH resource based on the at least one of the PUCCH resource repetition configuration or the PUCCH resource inter-slot frequency hopping configuration configured in the PUCCH resource configuration. The received PUCCH resource configuration may override a PUCCH format configuration. The apparatus may receive a DCI indicating the PUCCH resource and/or a MAC-CE associated with the PUCCH resource configuration, and may transmit the PUCCH based on the received DCI/MAC-CE.

30 Claims, 9 Drawing Sheets

Related U.S. Application Data

(60) Provisional application No. 63/081,147, filed on Sep. 21, 2020.

(58) Field of Classification Search
CPC ... H04L 5/0055; H04L 5/0053; H04L 1/1854; H04L 1/1858; H04L 5/0012
See application file for complete search history.

(56) References Cited

U.S. PATENT DOCUMENTS

| | | | |
|---|---|---|---|
| 2020/0145169 A1* | 5/2020 | Zhou | H04W 76/27 |
| 2020/0205150 A1* | 6/2020 | Cheng | H04W 72/21 |
| 2020/0259625 A1* | 8/2020 | Papasakellariou ... | H04B 7/0456 |
| 2020/0305182 A1* | 9/2020 | Zhou | H04W 72/04 |
| 2020/0383105 A1* | 12/2020 | Park | H04L 1/1896 |
| 2022/0095346 A1 | 3/2022 | Khoshnevisan et al. | |

OTHER PUBLICATIONS

International Preliminary Report on Patentability—PCT/US2021/046932—The International Bureau of WIPO—Geneva, Switzerland—Mar. 30, 2023.
International Search Report and Written Opinion—PCT/US2021/046932—ISA/EPO—Dec. 8, 2021.

* cited by examiner

| PUCCH format | Length in OFDM symbols | # of UCI Bits | Waveform | Description |
|---|---|---|---|---|
| 0 | 1-2 | ≤2 | CGS | Short PUCCH format with 1-2 UCI |
| 1 | 4-14 | ≤2 | CGS | Long PUCCH format with 1-2 UCI (TD-OCC) |
| 2 | 1-2 | >2 | OFDM | Short PUCCH with > 2 bits UCI |
| 3 | 4-14 | >2 | DFT-S-OFDM | Long PUCCH format with > 2-bits UCI and no multiplexing capability |
| 4 | 4-14 | >2 | DFT-S-OFDM | Long PUCCH format with > 2-bits UCI and multiplexing capability |

400

402

404

```
PUCCH-FormatConfig ::=     SEQUENCE {
  interslotFrequencyHopping    ENUMERATED {enabled}
  additionalDMRS               ENUMERATED {true}
  maxCodeRate                  PUCCH-MaxCodeRate
  nrofSlots                    ENUMERATED {n2, n4, n8}
  pi2BPSK                      ENUMERATED {enabled}
  simultaneousHARQ-ACK-CSI     ENUMERATED {true}
 ...}
```

PUCCH format repetition configuration 404a

PUCCH format inter-slot frequency hopping configuration 404b

```
PUCCH-Resource ::=        SEQUENCE {
  pucch-ResourceId          PUCCH-ResourceId,
  nrofSlots                 ENUMERATED { n2, n4, n8 }
  interslotFrequencyHopping ENUMERATED { enabled }
  startingPRB               PRB-Id,
  intraSlotFrequencyHopping ENUMERATED { enabled }
  secondHopPRB              PRB-Id
  format                    CHOICE {
      format0                 PUCCH-format0,
      format1                 PUCCH-format1,
      format2                 PUCCH-format2,
      format3                 PUCCH-format3,
      format4                 PUCCH-format4
  }
...}
```

406a PUCCH resource repetition configuration

406b PUCCH resource inter-slot frequency hopping configuration

ENHANCED PUCCH TRANSMISSION FOR REPETITION OR FREQUENCY HOPPING

CROSS REFERENCE TO RELATED APPLICATION(S)

This application is a Divisional to U.S. Non-provisional application Ser. No. 17/406,659, entitled "Enhanced PUCCH Transmission for Repetition or Frequency Hopping" and filed on Aug. 19, 2021, which claims the benefit of and priority to U.S. Provisional Application Ser. No. 63/081,147, entitled "Enhanced PUCCH Transmission for Repetition or Frequency Hopping" and filed on Sep. 21, 2020, which are expressly incorporated by reference herein in their entirety.

TECHNICAL FIELD

The present disclosure relates generally to communication systems, and more particularly, to an enhanced physical uplink control channel (PUCCH) transmission for repetition and/or frequency hopping.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A PUCCH resource repetition configuration and/or PUCCH resource inter-slot frequency hopping configuration for a PUCCH resource may override a PUCCH format repetition configuration and/or PUCCH format inter-slot frequency hopping configuration for a PUCCH format. The apparatus may receive a DCI indicating the PUCCH resource and/or the apparatus may receive a MAC-CE that configures the PUCCH repetition and/or the PUCCH resource inter-slot frequency hopping. Accordingly, through the DCI/MAC-CE, the apparatus may be configured dynamically in association with the PUCCH repetition and/or the PUCCH inter-slot frequency hopping.

In an aspect of the disclosure, a method, a computer-readable medium, and an apparatus are provided. The apparatus may be a device at a UE. The device may be a processor and/or a modem at a UE or the UE itself. The apparatus receives a PUCCH resource configuration associated with a PUCCH resource. The PUCCH resource configuration indicates at least one of a PUCCH resource repetition configuration or a PUCCH resource inter-slot frequency hopping configuration for the PUCCH resource that is independent of PUCCH formats. In addition, the apparatus transmits a PUCCH in the PUCCH resource based on the at least one of the PUCCH resource repetition configuration or the PUCCH resource inter-slot frequency hopping configuration configured in the PUCCH resource configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating PUCCH formats, a PUCCH format configuration IE, and a PUCCH resource IE.

DETAILED DESCRIPTION

Figure 1:
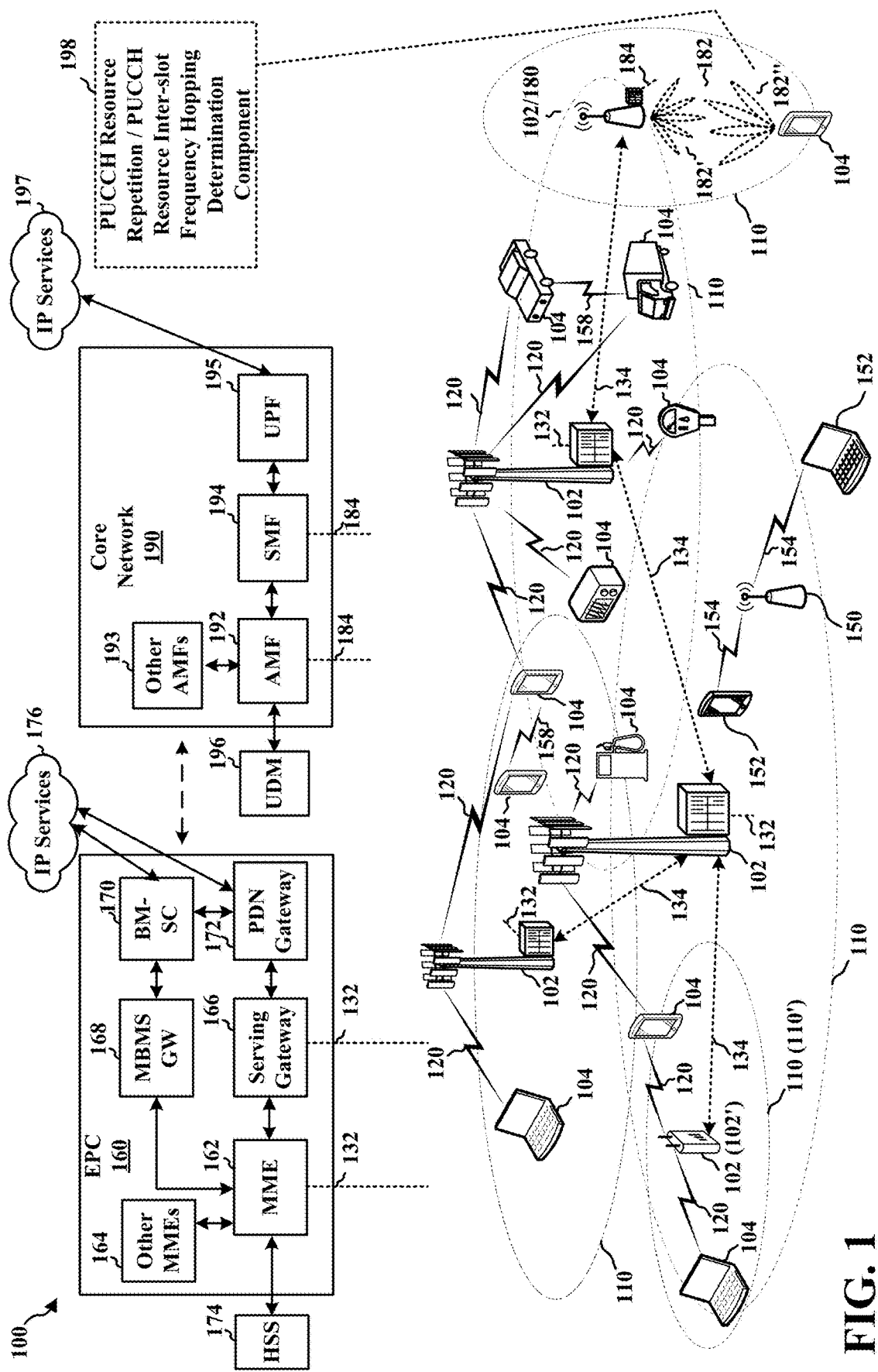
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured with a PUCCH Resource Repetition/PUCCH Resource Inter-slot Frequency Hopping Determination Component (198), which is configured to receive and to process a PUCCH resource repetition configuration and/or a PUCCH resource inter-slot frequency hopping configuration for a PUCCH transmission based on the configuration.

Although the following description may be focused on 5G NR, the concepts described herein may be applicable to other similar areas, such as LTE, LTE-A, CDMA, GSM, and other wireless technologies.

Figure 2:
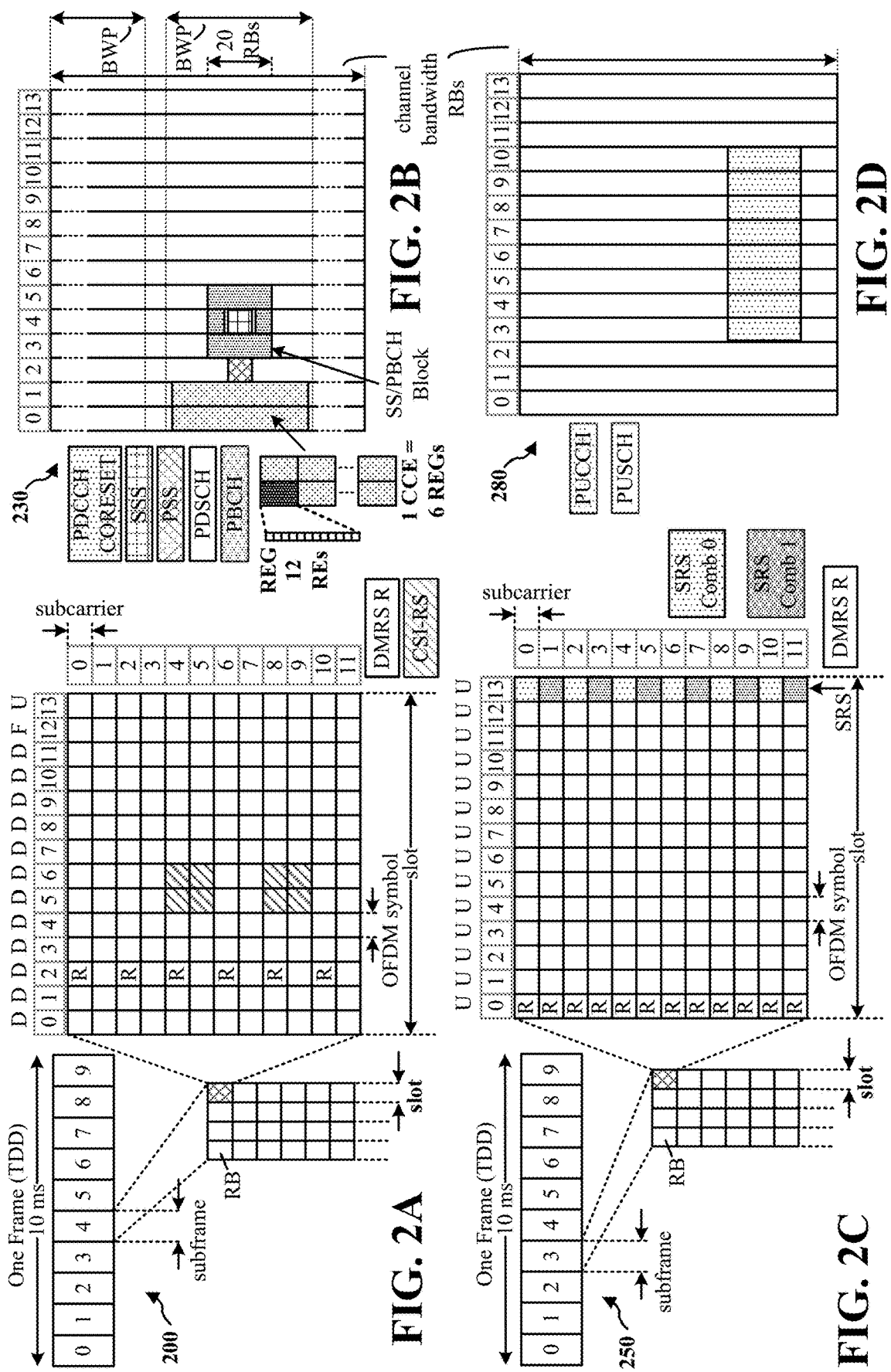
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^{\mu} * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
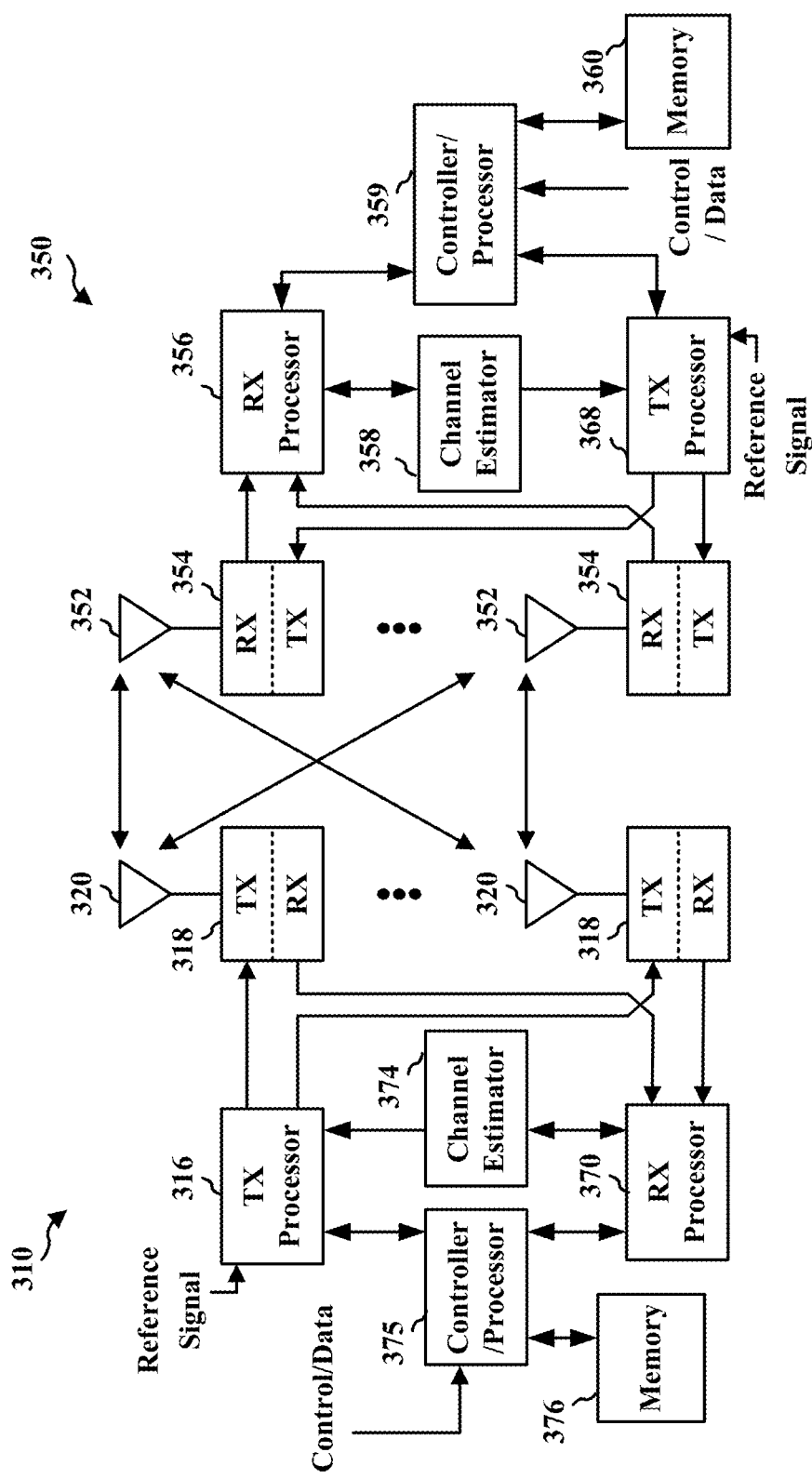
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 5:
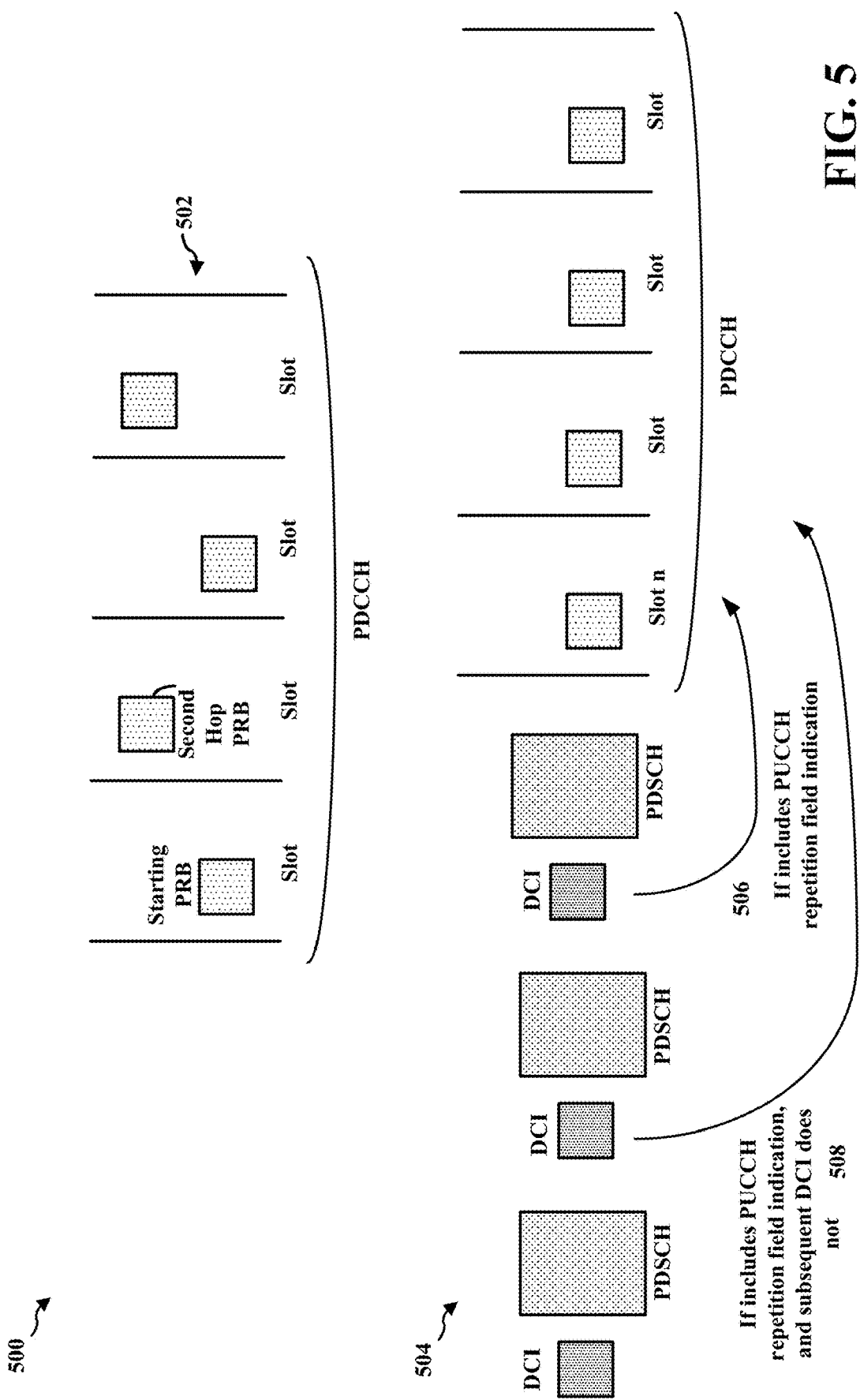
FIG. 5 is a diagram illustrating a PUCCH resource configured by the PUCCH resource IE, and DCI including a PUCCH repetition indication.

FIG. 4 is a diagram 400 illustrating PUCCH formats 402, a PUCCH format configuration IE 404, and a PUCCH resource IE 406. FIG. 5 is a diagram 500 illustrating a PUCCH resource 502 configured by the PUCCH resource IE 406, and in diagram 504, DCI including a PUCCH repetition indication. NR defines multiple (e.g., five) PUCCH formats with short/long duration, different payload size ranges, and different multiplexing capabilities. PUCCH format 0 is a short PUCCH format with 1-2 UCI bits, where the waveform is a computer generated sequence (CGS). PUCCH format 1 is a long PUCCH format with 1-2 UCI bits, using time division orthogonal cover codes (TD-OCC), where the waveform is a CGS. PUCCH format 2 is a short PUCCH format with greater than 2 UCI bits, where the waveform is OFDM. PUCCH format 3 is a long PUCCH format with greater than 2 UCI bits and no multiplexing capability, where the waveform is DFT-s-OFDM. PUCCH format 4 is a long PUCCH format with greater than 2 UCI bits and multiplexing capability, where the waveform is DFT-s-OFDM.

PUCCH resources may be configured via RRC signaling through the PUCCH resource IE 406. Up to 128 PUCCH resources may be configured. The PUCCH format for each PUCCH resource is part of the RRC configuration. That is, the PUCCH resource IE 406 includes a format field defining the PUCCH format (e.g., one of the five formats) for that PUCCH resource. Spatial relation (beam) may be activated by a MAC-CE per PUCCH resource. For multiplexing HARQ-ACK in a PUCCH resource, DCI (a DCI format that schedules PDSCH and the corresponding HARQ-ACK information) indicates a PUCCH resource indicator (PRI). The PUCCH resource may be indicated by a PRI within DCI. Accordingly, a PUCCH resource may be selected dynamically (i.e., dynamically configured for a UE) for an HARQ-ACK transmission.

PUCCH repetition in different slots may be supported for PUCCH formats 1, 3, and 4. A number of PUCCH repetitions is RRC configured for a given PUCCH format through the field nrofSlots (2, 4, or 8 slots) within the PUCCH format configuration IE 404. The format field nrofSlots may be referred to as a PUCCH format repetition configuration 404*a*. As the PUCCH format configuration IE 404 configures a format with the same PUCCH format repetition configuration 404*a*, all PUCCH resources with that format will have the same PUCCH format repetition configuration 404*a* (i.e., the same number of PUCCH repetitions). Likewise, the PUCCH inter-slot frequency hopping configuration is RRC configured for a given PUCCH format through the field interslotFrequencyHopping within the PUCCH format configuration IE 404. The format field interslotFrequencyHopping may be referred to as a PUCCH format inter-slot frequency hopping configuration 404*b*. As the PUCCH format configuration IE 404 configures a format with the same PUCCH format inter-slot frequency hopping configuration 404*b*, all PUCCH resources with that format will have the same PUCCH format inter-slot frequency hopping configuration 404*b* (i.e., with inter-slot frequency hopping disabled/enabled). The same PUCCH resource is used across all the repetitions in different slots. In one example, one PUCCH-SpatialRelationInfo (beam) may be used. The same symbols may be used in every slot.

As discussed supra, the format field interslotFrequencyHopping may be referred to as a PUCCH format inter-slot frequency hopping configuration 404*b*. Referring to the diagram of the PUCCH resource 502, if interslotFrequencyHopping is enabled for a PUCCH format, the UE transmits the PUCCH for the PUCCH format starting from a first physical resource block (PRB), provided by starting PRB in slots with even number, and starting from the second PRB, provided by secondHopPRB in slots with an odd number. The slot indicated to the UE for the first PUCCH transmission may have number 0. A UE may not expect to be configured to perform frequency hopping for a PUCCH transmission within a slot.

For PUCCH repetition, the number of PUCCH repetitions is semi-statically configured through RRC signaling. As such, the number of PUCCH repetitions may not be as flexibly controlled. As discussed supra, the PUCCH repetition is configured per PUCCH format. As such, all PUCCH transmissions with that PUCCH format may have the same number of PUCCH repetitions. For example, it would not be possible to have no PUCCH repetition (e.g., one PUCCH repetition) for a first PUCCH transmission with PUCCH format 1 while having two PUCCH repetitions for a second PUCCH transmission with PUCCH format 1 unless RRC reconfigures the number of PUCCH repetitions for PUCCH format 1. No options are currently available for dynamically indicating the number of PUCCH repetitions for a PUCCH resource, such as for example, through a MAC-CE or DCI.

In a first configuration, a number of PUCCH repetitions and/or inter-slot (or inter-repetition) frequency hopping can be RRC configured per PUCCH resource configuration (e.g., instead of per PUCCH format, or overriding the configuration per PUCCH format). For example, the PUCCH resource IE 406 may provide a PUCCH resource configuration associated with a PUCCH resource. The PUCCH resource configuration for the PUCCH resource may indicate a PUCCH resource repetition configuration 406*a* through, for example, the field nrofSlots (indicated in bold), and/or a PUCCH resource inter-slot frequency hopping configuration 406*b* through, for example, the field interslotFrequencyHopping (indicated in bold). Both the PUCCH resource repetition configuration 406*a* and the PUCCH resource inter-slot frequency hopping configuration 406*b* are specifically for the PUCCH resource and are independent of PUCCH formats. In one configuration, enhanced RRC signaling may be used to dynamically configure PUCCH repetition factor per PUCCH resource. For example, the PUCCH resource indication mechanism based on a PRI field and a starting CCE index of DCI to indicate a PUCCH resource and its associated repetition factor.

For an HARQ-ACK transmission, DCI may include a PRI field that indicates a PUCCH resource with a number of PUCCH repetitions. Accordingly, dynamic indication of the number of PUCCH repetitions may be achieved by dynamic indication of a PUCCH resource. For periodic CSI/scheduling request (SR) (PUCCH resource is RRC configured without DCI signaling) as well as HARQ-ACK, configuring the PUCCH repetition and PUCCH inter-slot frequency hopping for a PUCCH resource enables using the same PUCCH format with different number of PUCCH repetitions by using different PUCCH resources. Accordingly, PUCCH repetition and PUCCH inter-slot frequency hopping may be more flexibly configured.

Optionally, a MAC-CE can update, overwrite, or enable the number of PUCCH repetitions per PUCCH resource. The MAC-CE may update the spatial relation information (beam) for a given PUCCH resource. The same MAC-CE message may be used for this purpose, for example, by adding a field to the MAC-CE. In a first configuration, a MAC-CE may indicate the number of PUCCH repetitions. In a second configuration, a MAC-CE may activate or deactivate more than one PUCCH repetition. For example, more than one PUCCH repetition may be configured as part of the PUCCH resource configuration, but a MAC-CE may include one bit to indicate whether that number is used or no repetition (i.e., one repetition) is assumed. If the number of PUCCH repetitions is not configured in RRC, but a MAC-CE indicates PUCCH repetition is activated, a default number of PUCCH repetitions (e.g., two PUCCH repetitions) may be assumed. A MAC-CE may also enable or disable PUCCH inter-slot frequency hopping when PUCCH repetition is enabled or the number of PUCCH repetitions is indicated to be greater than one.

With respect to conflict resolution of a legacy RRC configuration through the PUCCH format configuration IE 404 versus the RRC configuration through the PUCCH resource IE 406, if the number of PUCCH repetitions/PUCCH inter-slot frequency hopping (enabled or disabled) is configured for a PUCCH format, a UE may determine whether to use the PUCCH format repetition configuration 404a or the PUCCH resource repetition configuration 406a, and whether to use the PUCCH format inter-slot frequency hopping configuration 404b or the PUCCH resource inter-slot frequency hopping configuration 406b. If a PUCCH resource that is configured with that PUCCH format is configured, via RRC, or activated, via MAC-CE, with a different number of PUCCH repetitions or a different configuration of PUCCH inter-slot frequency hopping, the UE may override the PUCCH format repetition configuration 404a with the PUCCH resource repetition configuration 406a and override the PUCCH format inter-slot frequency hopping configuration 404b with the PUCCH resource inter-slot frequency hopping configuration 406b. That is, the PUCCH resource parameters may overwrite/override the PUCCH format parameters. If a PUCCH resource that is configured with that PUCCH format is not configured or activated with a number of PUCCH repetitions or a configuration of PUCCH inter-slot frequency hopping, in a first configuration, the RRC configuration of the PUCCH format may be assumed (for PUCCH repetition and/or PUCCH inter-slot frequency hopping) when PUCCH is transmitted using the PUCCH resource. In a second configuration, no PUCCH repetition and/or no PUCCH inter-slot frequency hopping may be assumed when PUCCH is transmitted using the PUCCH resource.

Alternatively, referring to the diagram 504, a new field in the DCI (e.g., DCI format that schedules PDSCH and the corresponding HARQ-ACK) may be added to indicate the number of PUCCH repetitions and/or PUCCH inter-slot frequency hopping. In this option, a PRI field may indicate the PUCCH resource for an HARQ-ACK transmission while a new field may indicate the number of PUCCH repetitions and/or a configuration for PUCCH inter-slot frequency hopping. If more than one DCI indicate the same slot for HARQ-ACK multiplexing, the number of PUCCH repetitions and/or the configuration for PUCCH inter-slot frequency hopping for transmission of HARQ-ACK may be determined by the UE based on the last DCI (see, for example, 506). The presence of the new field in DCI may be RRC configured. The RRC configuration may be separate for DCI formats 1_1 versus DCI format 1_2. The new field may not be added to fallback DCI (DCI format 1_0) and may not be configured for both DCI format 1_1 and 1_2, as mentioned above. As such, some DCIs may include the new field and some DCIs may not include the new field. In a first configuration, if the last DCI is a DCI format that does not include the new field, a UE may assume the number of PUCCH repetitions to be one. In a second configuration, a UE may determine the number of PUCCH repetitions based on the last DCI that includes the new field (which may not be the absolute last DCI) (see, for example, 508).

Figure 6:
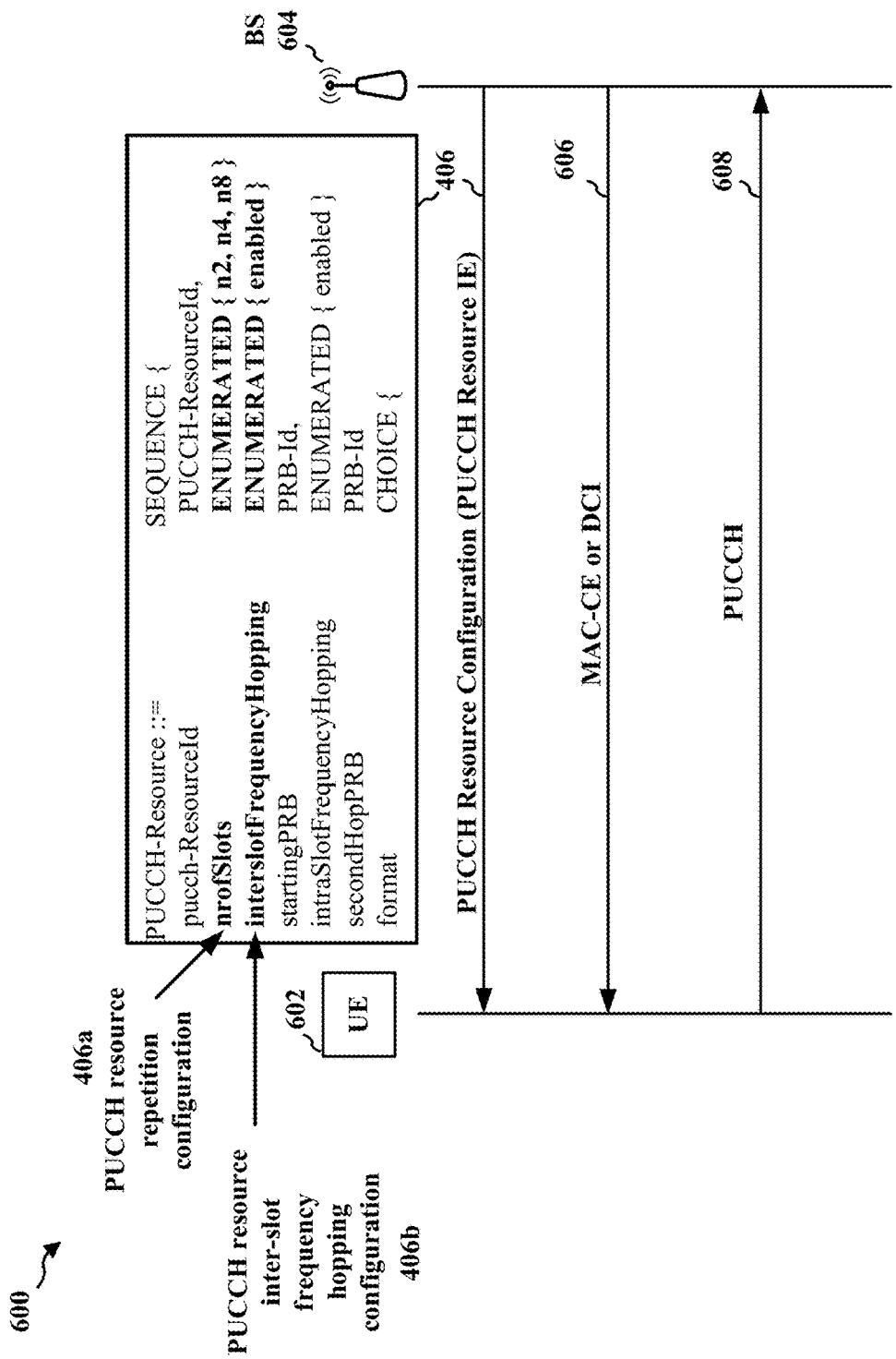
FIG. 6 is a call-flow diagram illustrating a configuration of a PUCCH repetition and/or PUCCH inter-slot frequency hopping for a PUCCH resource, independent of PUCCH formats.

FIG. 6 is a call flow diagram 600 illustrating a configuration of a PUCCH repetition and/or PUCCH inter-slot frequency hopping for a PUCCH resource, independent of PUCCH formats. A base station 604 may be configured to provide at least one cell. A UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350.

A UE 602 receives, from a base station 604, a PUCCH resource configuration (e.g., in a PUCCH resource IE 406) associated with a PUCCH resource. The PUCCH resource configuration (e.g., 406) indicates at least one of a PUCCH resource repetition configuration (e.g., 406a) or a PUCCH resource inter-slot frequency hopping configuration (e.g., 406b) for the PUCCH resource that is independent of PUCCH formats. The PUCCH resource repetition configuration 406a, defined through the nrofSlots field within the PUCCH resource IE, and the PUCCH resource inter-slot frequency hopping configuration 406b, defined through the interslotFrequencyHopping field in the PUCCH resource IE, are both defined with respect to the PUCCH resource IE, and are therefore independent of the PUCCH formats. Subsequently, the UE 602 transmits a PUCCH 608 in the PUCCH resource based on the at least one of the PUCCH resource repetition configuration 406a or the PUCCH resource inter-slot frequency hopping configuration 406b configured in the PUCCH resource configuration.

As discussed supra, the PUCCH resource repetition configuration 406a and/or the PUCCH resource inter-slot frequency hopping configuration 406b is received in a PUCCH resource IE through RRC signaling. As is clear from the PUCCH resource IE, the PUCCH resource IE further configures the PUCCH resource to be associated with one PUCCH format. The PUCCH format (e.g., PUCCH format configuration IE 404) has a PUCCH format repetition configuration 404a and a PUCCH format inter-slot frequency hopping configuration 404b, and the PUCCH resource repetition configuration 406a and/or the PUCCH resource inter-slot frequency hopping configuration 406b overrides the PUCCH format repetition configuration 404a and/or the PUCCH format inter-slot frequency hopping configuration 404b for the PUCCH resource. When the PUCCH resource repetition configuration 406a is unconfigured for a specific number of PUCCH repetitions, the UE 602 may determine a number of PUCCH repetitions for transmission of the PUCCH based on the PUCCH format repetition configuration 404a. Alternatively, when the PUCCH resource repetition configuration 406a is unconfigured for a specific number of PUCCH repetitions, the UE 602 may determine a number of PUCCH repetitions for transmission of the PUCCH to be one.

As discussed supra, while the PUCCH resource repetition configuration 406a and the PUCCH resource inter-slot frequency hopping configuration 406b are configured semi-statically through RRC signaling, multiple different PUCCH resource IEs may define different PUCCH resources with different configurations of the PUCCH repetition/PUCCH inter-slot frequency hopping, and the UE 602 may be configured with PUCCH repetition/PUCCH inter-slot frequency hopping dynamically through a received DCI, at 606, that indicates the PUCCH resource and/or or MAC-CE, at 606) that configures the PUCCH repetition and/or the PUCCH inter-slot frequency hopping.

Figure 7:
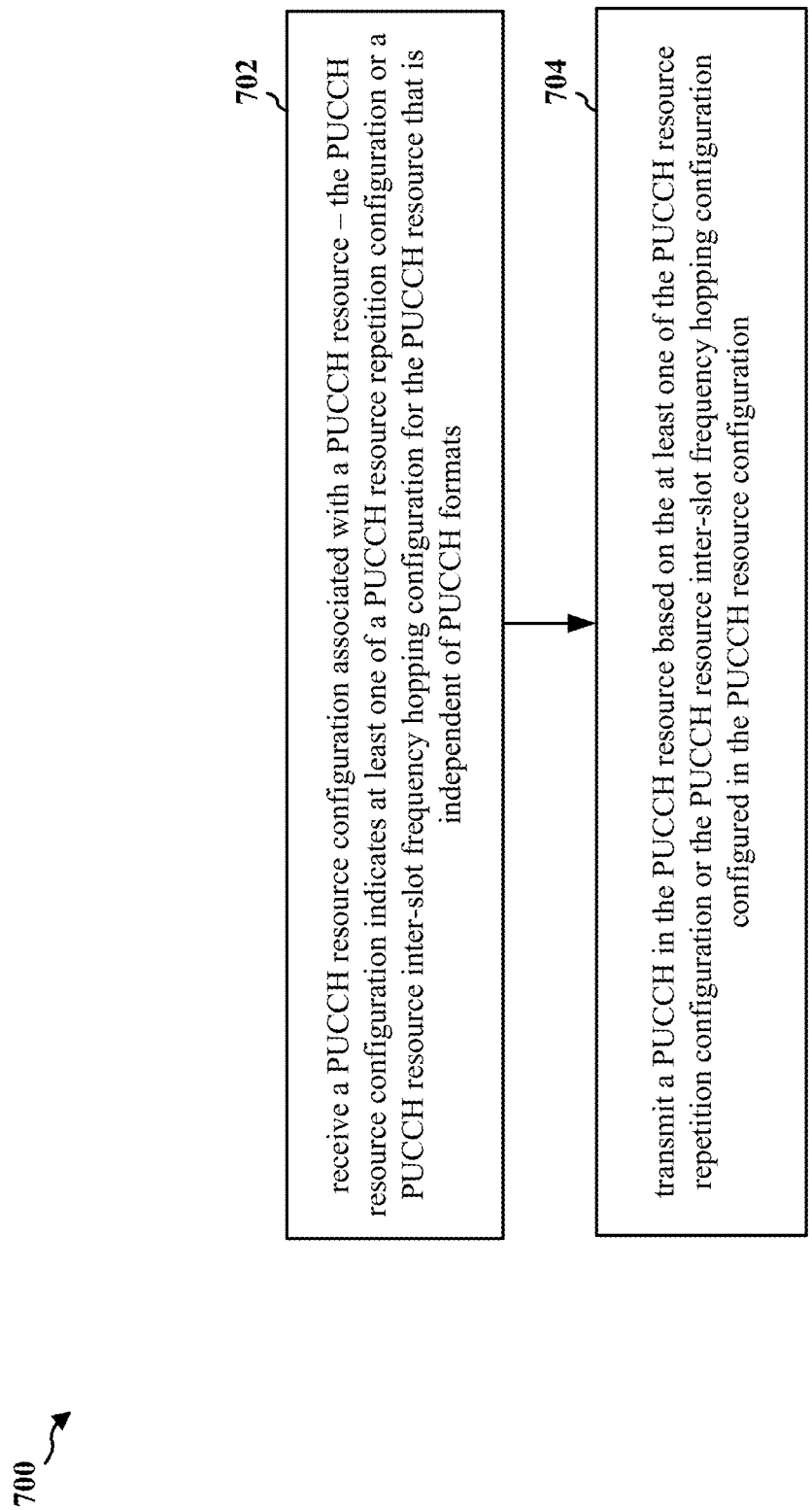
FIG. 7 is a flowchart of a method of wireless communication.

FIG. 7 is a flowchart 700 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to be configured dynamically in association with a PUCCH repetition and/or a PUCCH inter-slot frequency hopping.

At 702, the UE receives a PUCCH resource configuration associated with a PUCCH resource. For example, 702 may be performed by reception component 930 of apparatus 902.

The PUCCH resource configuration indicates at least one of a PUCCH resource repetition configuration 406a or a PUCCH resource inter-slot frequency hopping configuration 406b for the PUCCH resource that is independent of PUCCH formats. In one configuration, the at least one of the PUCCH resource repetition configuration 406a or the PUCCH resource inter-slot frequency hopping configuration 406b is received in a PUCCH resource IE 406 through RRC signaling. The PUCCH resource configuration further configures the PUCCH resource to be associated with a PUCCH format of the PUCCH formats. The PUCCH format has a PUCCH format repetition configuration 404a and a PUCCH format inter-slot frequency hopping configuration 404b. The at least one of the PUCCH resource repetition configuration 406a or the PUCCH resource inter-slot frequency hopping configuration 406b overrides at least one of the PUCCH format repetition configuration 404a or the PUCCH format inter-slot frequency hopping configuration 404b for the PUCCH resource. In one configuration, the at least one of the PUCCH resource repetition configuration or the PUCCH resource inter-slot frequency hopping configuration is received in downlink control information (DCI). The DCI is a last received DCI of a set of DCIs indicating a same slot for transmission of hybrid automatic repeat request (HARD) acknowledgment (ACK) (HARQ-ACK) information. In one configuration, the DCI includes a first field indicating the PUCCH resource and a second field indicating a number of PUCCH repetitions associated with the PUCCH resource repetition configuration or indicating the PUCCH resource inter-slot frequency hopping configuration, the first field being a PUCCH resource indicator (PRI) field. In one configuration, the DCI is a last received DCI of a set of DCIs that include the second field and indicate a same slot for transmission of HARQ-ACK information.

At 704, the UE transmits a PUCCH in the PUCCH resource. For example, 704 may be performed by transmission component 934 of apparatus 902. The UE transmits the PUCCH in the PUCCH resource based on the at least one of the PUCCH resource repetition configuration 406a or the PUCCH resource inter-slot frequency hopping configuration 406b configured in the PUCCH resource configuration.

Figure 8:
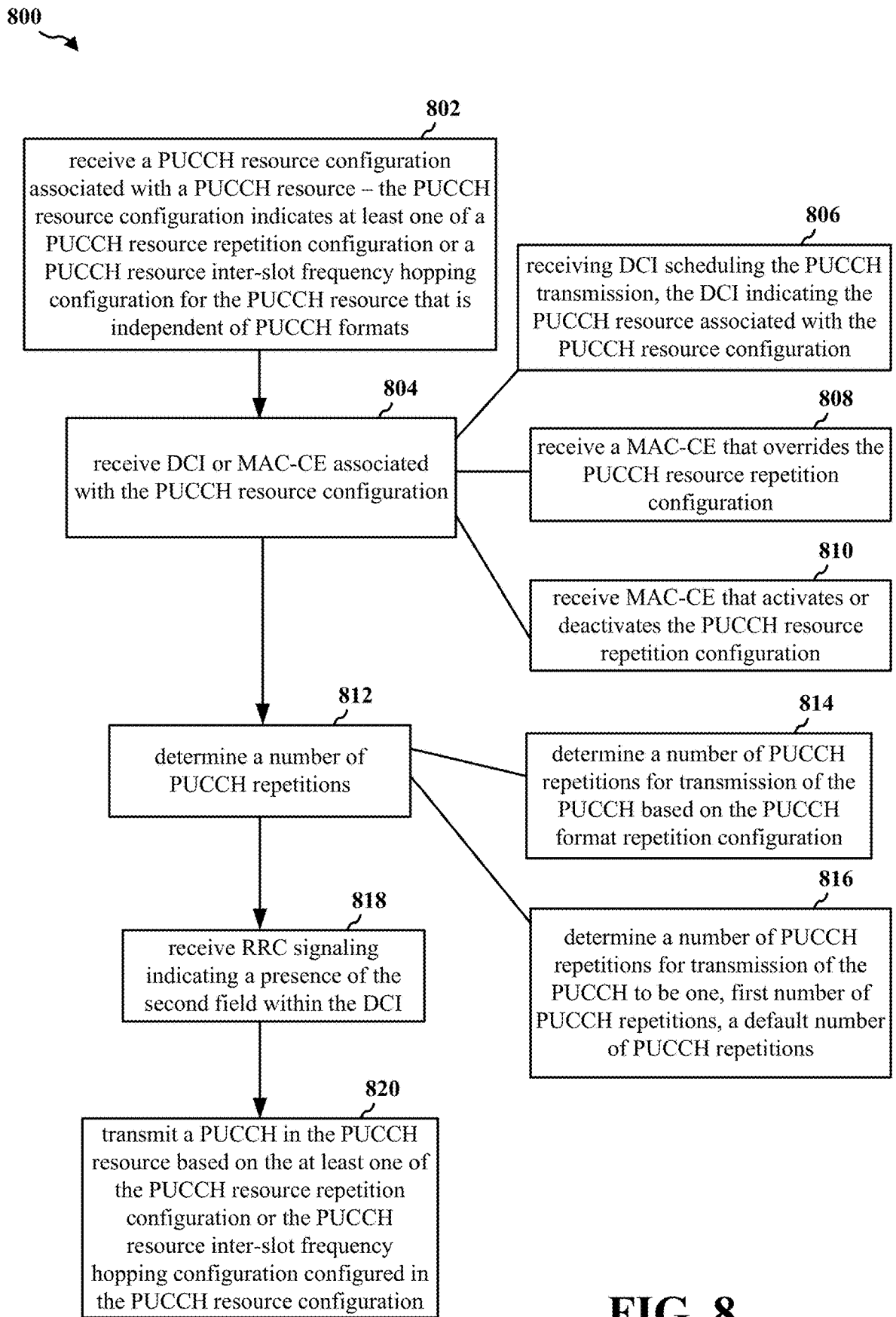
FIG. 8 is a flowchart of a method of wireless communication.

FIG. 8 is a flowchart 800 of a method of wireless communication. The method may be performed by a UE or a component of a UE (e.g., the UE 104; the apparatus 902; the cellular baseband processor 904, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to be configured dynamically in association with a PUCCH repetition and/or a PUCCH inter-slot frequency hopping.

At 802, the UE receives a PUCCH resource configuration associated with a PUCCH resource. For example, 802 may be performed by reception component 930 of apparatus 902. The PUCCH resource configuration indicates at least one of a PUCCH resource repetition configuration 406a or a PUCCH resource inter-slot frequency hopping configuration 406b for the PUCCH resource that is independent of PUCCH formats. In one configuration, the at least one of the PUCCH resource repetition configuration 406a or the PUCCH resource inter-slot frequency hopping configuration 406b is received in a PUCCH resource IE 406 through RRC signaling. The PUCCH resource configuration further configures the PUCCH resource to be associated with a PUCCH format of the PUCCH formats. The PUCCH format has a PUCCH format repetition configuration 404a and a PUCCH format inter-slot frequency hopping configuration 404b. The at least one of the PUCCH resource repetition configuration 406a or the PUCCH resource inter-slot frequency hopping configuration 406b overrides at least one of the PUCCH format repetition configuration 404a or the PUCCH format inter-slot frequency hopping configuration 404b for the PUCCH resource. In one configuration, the at least one of the PUCCH resource repetition configuration or the PUCCH resource inter-slot frequency hopping configuration is received in downlink control information (DCI). The DCI is a last received DCI of a set of DCIs indicating a same slot for transmission of hybrid automatic repeat request (HARD) acknowledgment (ACK) (HARQ-ACK) information. In one configuration, the DCI includes a first field indicating the PUCCH resource and a second field indicating a number of PUCCH repetitions associated with the PUCCH resource repetition configuration or indicating the PUCCH resource inter-slot frequency hopping configuration, the first field being a PUCCH resource indicator (PRI) field. In one configuration, the DCI is a last received DCI of a set of DCIs that include the second field and indicate a same slot for transmission of HARQ-ACK information.

At 804, the UE receives DCI or MAC-CE associated with the PUCCH resource configuration. For example, 804 may be performed by reception component 930 of apparatus 902. In one configuration, for example at 806, the UE may receive DCI scheduling the PUCCH transmission. The DCI indicates the PUCCH resource associated with the PUCCH resource configuration indicating that at least one of the PUCCH resource repetition configuration 406a or the PUCCH resource inter-slot frequency hopping configuration 406b. In one configuration, the at least one of the PUCCH resource repetition configuration 406a or the PUCCH resource inter-slot frequency hopping configuration 406b is received in DCI. The DCI may be received in a last received DCI of a set of DCIs indicating the same slot for transmission of HARQ-ACK information. When the DCI indicates a number of PUCCH repetitions, the UE may determine the number of PUCCH repetitions for the PUCCH resource configuration to be one when the last received DCI excludes an indication of the number of PUCCH repetitions. The DCI may include a first field (PRI field) indicating the PUCCH resource and a second field indicating a number of PUCCH repetitions associated with the PUCCH resource repetition configuration 406a or indicating the PUCCH resource inter-slot frequency hopping configuration 406b. The UE may receive RRC signaling indicating a presence of the second field within the DCI. The DCI may be the last received DCI of a set of DCIs that include the second field and indicate the same slot for transmission of HARQ-ACK information. In one configuration, for example at 808, the UE may receive a MAC-CE that overrides the PUCCH resource repetition configuration 406a. The PUCCH resource repetition configuration specifying a first number of PUCCH repetitions. The MAC-CE may indicate a second number of PUCCH repetitions for the PUCCH transmission. In one configuration, for example at 810, the UE receives a MAC-CE that activates or deactivates the PUCCH resource repetition configuration. In one configuration, the MAC-CE may enable or disable inter-slot frequency hopping associated with the PUCCH resource inter-slot frequency hopping configuration 406b when a number of PUCCH repetitions for the PUCCH transmission is greater than one.

At 812, the UE determines a number of PUCCH repetitions. For example, 812 may be performed by PUCCH resource repetition/PUCCH resource inter-slot frequency hopping determination component 940 of apparatus 902. In one configuration, for example at 814, the UE determines a number of PUCCH repetitions for transmission of the PUCCH based on the PUCCH format repetition configuration. The UE determines the number of PUCCH repetitions for transmission of the PUCCH based on the PUCCH format repetition configuration when the PUCCH resource repetition configuration is unconfigured for a specific number of PUCCH repetitions. In one configuration, for example at 816, the UE determines a number of PUCCH repetitions for transmission of the PUCCH to be one, a first number of PUCCH repetitions, or a default number of PUCCH repetitions. In one configuration, the UE determines a number of PUCCH repetitions for transmission of the PUCCH to be one when the PUCCH resource repetition configuration is unconfigured for a specific number of PUCCH repetitions. The PUCCH resource repetition configuration may indicate a first number of PUCCH repetitions. In one configuration, the UE determines the number of PUCCH repetitions for the PUCCH transmission to be equal to the first number of PUCCH repetitions when the MAC-CE activates the PUCCH resource repetition configuration. In one configuration, the UE determines the number of PUCCH repetitions for the PUCCH transmission to be equal to one when the MAC-CE deactivates the PUCCH resource repetition configuration. In one configuration, the UE determines a number of PUCCH repetitions for the PUCCH transmission to be the default number of PUCCH repetitions when the MAC-CE activates the PUCCH resource repetition configuration and the PUCCH resource repetition configuration indicates no repetitions. The DCI may indicate a number of PUCCH repetitions. In one configuration, the UE determines the number of PUCCH repetitions for the PUCCH resource configuration to be one when the last received DCI excludes an indication of the number of PUCCH repetitions. In one configuration, when the PUCCH resource repetition configuration 406*a* indicates a first number of PUCCH repetitions, the UE may determine a number of PUCCH repetitions for the PUCCH transmission to be equal to the first number of PUCCH repetitions when the MAC-CE activates the PUCCH resource repetition configuration 406*a*, and may determine the number of PUCCH repetitions for the PUCCH transmission to be equal to one when the MAC-CE deactivates the PUCCH resource repetition configuration 406*a*. Further, in such a configuration, when the PUCCH resource repetition configuration 406*a* indicates no repetitions, the UE may determine the number of PUCCH repetitions for the PUCCH transmission to be a default number of PUCCH repetitions when the MAC-CE activates the PUCCH resource repetition configuration 406*a*.

At 818, the UE receives RRC signaling indicating a presences of a second field within the DCI. For example, 818 may be performed by reception component 930 of apparatus 902.

At 820, the UE transmits a PUCCH in the PUCCH resource. For example, 820 may be performed by transmission component 934 of apparatus 902. The UE transmits the PUCCH in the PUCCH resource based on the at least one of the PUCCH resource repetition configuration 406*a* or the PUCCH resource inter-slot frequency hopping configuration 406*b* configured in the PUCCH resource configuration. In one configuration, the PUCCH may be transmitted based on a received MAC-CE indicating a second number of PUCCH repetitions.

Figure 9:
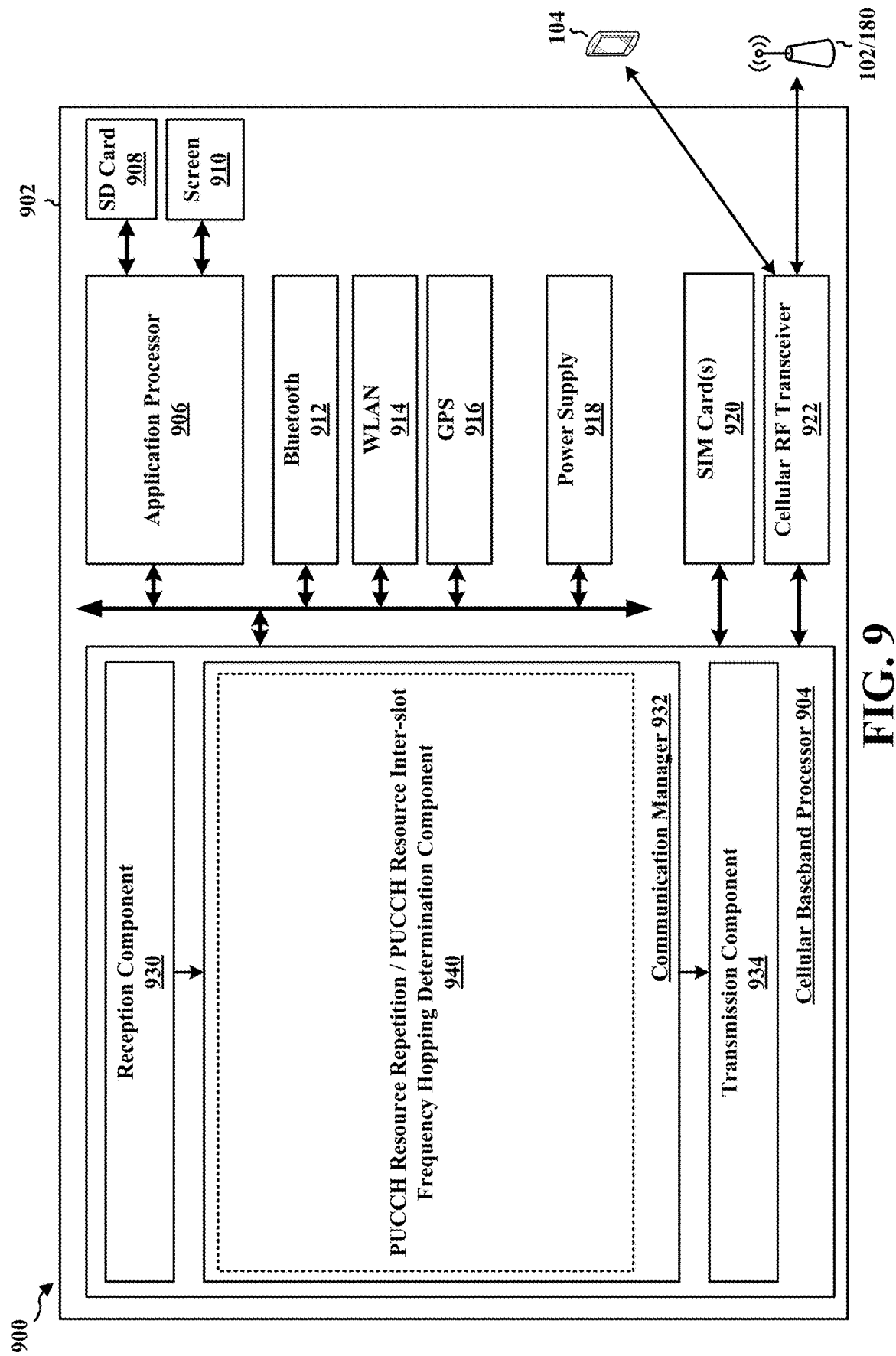
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a PUCCH resource repetition/PUCCH resource inter-slot frequency hopping determination component 940 that is configured to process the received PUCCH resource configuration and determine the PUCCH repetition and/or the PUCCH inter-slot frequency hopping configuration, e.g., as described in connection with 812, 814, or 816 of FIG. 8. The reception component 930 is configured to receive a PUCCH resource configuration associated with a PUCCH resource, e.g., as described in connection with 702 of FIG. 7 or 802 of FIG. 8. The reception component 930 may be further configured to receive DCI or MAC-CE associated with the PUCCH resource configuration, e.g., as described in connection with 804, 806, 808, or 810 of FIG. 8. The reception component 930 may be further configured to receive RRC signaling indicating the presence of a second field within the DCI, e.g., as described in connection with 818 of FIG. 8. The transmission component 934 is configured to transmit a PUCCH in the PUCCH resource, e.g., as described in connection with 704 of FIG. 7 or 820 of FIG. 8.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for receiving a PUCCH resource configuration associated with a PUCCH resource, the PUCCH resource configuration indicating at least one of a PUCCH resource repetition configuration or a PUCCH resource inter-slot frequency hopping configuration for the PUCCH resource that is independent of PUCCH formats. The apparatus includes means for transmitting a PUCCH in the PUCCH resource based on the at least one of the PUCCH resource repetition configuration or the PUCCH resource inter-slot frequency hopping configuration configured in the PUCCH resource configuration. The apparatus further includes means for determining a number of PUCCH repetitions for transmission of the PUCCH based on the PUCCH format repetition configuration when the PUCCH resource repetition configuration is unconfigured for a specific number of PUCCH repetitions. The apparatus further includes means for determining a number of PUCCH repetitions for transmission of the PUCCH to be one when the PUCCH resource repetition configuration is unconfigured for a specific number of PUCCH repetitions. The apparatus further includes means for receiving DCI scheduling the PUCCH transmission. The DCI indicating the PUCCH resource associated with the PUCCH resource configuration indicating that at least one of the PUCCH resource repetition configuration or the PUCCH resource inter-slot frequency hopping configuration. The apparatus further includes means for receiving MAC-CE that overrides the PUCCH resource repetition configuration. The MAC-CE indicating a second number of PUCCH repetitions for the PUCCH transmission. The PUCCH being transmitted based on the received MAC-CE indicating the second number of PUCCH repetitions. The apparatus further includes means for receiving MAC-CE that activates or deactivates the PUCCH resource repetition configuration. The apparatus further includes means for determining a number of PUCCH repetitions for the PUCCH transmission to be equal to the first number of PUCCH repetitions when the MAC-CE activates the PUCCH resource repetition configuration. The apparatus further includes means for determining the number of PUCCH repetitions for the PUCCH transmission to be equal to one when the MAC-CE deactivates the PUCCH resource repetition configuration. The apparatus further includes means for determining a number of PUCCH repetitions for the PUCCH transmission to be a default number of PUCCH repetitions when the MAC-CE activates the PUCCH resource repetition configuration and the PUCCH resource repetition configuration indicates no repetitions. The apparatus further includes means for determining the number of PUCCH repetitions for the PUCCH resource configuration to be one when the last received DCI excludes an indication of the number of PUCCH repetitions. The apparatus further includes means for receiving radio resource control (RRC) signaling indicating a presence of the second field within the DCI. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

As discussed supra, a UE may receive a PUCCH resource configuration (e.g., 406) associated with a PUCCH resource, where the PUCCH resource configuration indicates a PUCCH resource repetition configuration 406a and/or a PUCCH resource inter-slot frequency hopping configuration 406b for the PUCCH resource. As the PUCCH resource configuration itself configures the PUCCH resource repetition configuration 406a and the PUCCH resource inter-slot frequency hopping configuration 406b for the PUCCH resource, both the PUCCH resource repetition configuration 406a and the PUCCH resource inter-slot frequency hopping configuration 406b are independent of the PUCCH formats. The PUCCH formats may configure a PUCCH format repetition configuration 404a and/or a PUCCH format inter-slot frequency hopping configuration 404b, both of which may be overridden by the PUCCH resource repetition configuration 406a and the PUCCH resource inter-slot frequency hopping configuration 406b. The UE may receive a DCI/MAC-CE that is associated with the PUCCH resource and/or PUCCH resource configuration. As such, the PUCCH repetition and/or PUCCH inter-slot frequency hopping may be inherently dynamically configured, providing flexibility in the configuration of the UE with the PUCCH repetition and/or PUCCH inter-slot frequency hopping. The UE may then transmit a PUCCH in the PUCCH resource based on the PUCCH resource repetition configuration, the PUCCH resource inter-slot frequency hopping configuration, the DCI, and/or the MAC-CE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a PUCCH resource configuration associated with a PUCCH resource, the PUCCH resource configuration indicating at least one of a PUCCH resource repetition configuration or a PUCCH resource inter-slot frequency hopping configuration for the PUCCH resource that is independent of PUCCH formats; and transmit a PUCCH in the PUCCH resource based on the at least one of the PUCCH resource repetition configuration or the PUCCH resource inter-slot frequency hopping configuration configured in the PUCCH resource configuration.

Aspect 2 is the apparatus of aspect 1, further including a transceiver coupled to the at least one processor.

Aspect 3 is the apparatus of any of aspects 1 and 2, further includes that the at least one of the PUCCH resource repetition configuration or the PUCCH resource inter-slot frequency hopping configuration is received in a PUCCH resource IE through RRC signaling.

Aspect 4 is the apparatus of any of aspects 1-3, further includes that the PUCCH resource configuration further configures the PUCCH resource to be associated with a PUCCH format of the PUCCH formats.

Aspect 5 is the apparatus of any of aspects 1-4, further includes that the PUCCH format has a PUCCH format repetition configuration and a PUCCH format inter-slot frequency hopping configuration, and the at least one of the PUCCH resource repetition configuration or the PUCCH resource inter-slot frequency hopping configuration overrides at least one of the PUCCH format repetition configuration or the PUCCH format inter-slot frequency hopping configuration for the PUCCH resource, Aspect 6 is the apparatus of any of aspects 1-5, further includes that the at least one processor is further configured to determine a number of PUCCH repetitions for transmission of the PUCCH based on the PUCCH format repetition configuration when the PUCCH resource repetition configuration is unconfigured for a specific number of PUCCH repetitions.

Aspect 7 is the apparatus of any of aspects 1-6, further includes that the at least one processor is further configured to determine a number of PUCCH repetitions for transmission of the PUCCH to be one when the PUCCH resource repetition configuration is unconfigured for a specific number of PUCCH repetitions.

Aspect 8 is the apparatus of any of aspects 1-7, further includes that the at least one processor is further configured to receive downlink control information (DCI) scheduling PUCCH transmission, the DCI indicating the PUCCH resource associated with the PUCCH resource configuration indicating that at least one of the PUCCH resource repetition configuration or the PUCCH resource inter-slot frequency hopping configuration.

Aspect 9 is the apparatus of any of aspects 1-8, further includes that the PUCCH resource repetition configuration indicates a first number of PUCCH repetitions further includes that the at least one processor is further configured to receive a MAC-CE that overrides the PUCCH resource repetition configuration, the MAC-CE indicating a second number of PUCCH repetitions for PUCCH transmission, the PUCCH being transmitted based on the received MAC-CE indicating the second number of PUCCH repetitions.

Aspect 10 is the apparatus of any of aspects 1-9, further includes that the at least one processor is further configured to receive a MAC-CE that activates or deactivates the PUCCH resource repetition configuration.

Aspect 11 is the apparatus of any of aspects 1-10, further includes that PUCCH resource repetition configuration indicates a first number of PUCCH repetitions, further includes that the at least one processor is further configured to determine a number of PUCCH repetitions for PUCCH transmission to be equal to the first number of PUCCH repetitions when the MAC-CE activates the PUCCH resource repetition configuration; and determine the number of PUCCH repetitions for the PUCCH transmission to be equal to one when the MAC-CE deactivates the PUCCH resource repetition configuration.

Aspect 12 is the apparatus of any of aspects 1-11, further includes that the at least one processor is further configured to determine a number of PUCCH repetitions for PUCCH transmission to be a default number of PUCCH repetitions when the MAC-CE activates the PUCCH resource repetition configuration and the PUCCH resource repetition configuration indicates no repetitions.

Aspect 13 is the apparatus of any of aspects 1-12, further includes that the MAC-CE enables or disables inter-slot frequency hopping associated with the PUCCH resource inter-slot frequency hopping configuration when a number of PUCCH repetitions for PUCCH transmission is greater than one.

Aspect 14 is the apparatus of any of aspects 1-13, further includes that the at least one of the PUCCH resource repetition configuration or the PUCCH resource inter-slot frequency hopping configuration is received in DCI.

Aspect 15 is the apparatus of any of aspects 1-14, further includes that the DCI is a last received DCI of a set of DCIs indicating a same slot for transmission of HARQ-ACK information.

Aspect 16 is the apparatus of any of aspects 1-15, further includes that the DCI indicates a number of PUCCH repetitions, further includes that the at least one processor is further configured to determine the number of PUCCH repetitions for the PUCCH resource configuration to be one when the last received DCI excludes an indication of the number of PUCCH repetitions.

Aspect 17 is the apparatus of any of aspects 1-16, further includes that the DCI includes a first field indicating the PUCCH resource and a second field indicating a number of PUCCH repetitions associated with the PUCCH resource repetition configuration or indicating the PUCCH resource inter-slot frequency hopping configuration, the first field being a PRI field.

Aspect 18 is the apparatus of any of aspects 1-17, further includes that the at least one processor is further configured to receive RRC signaling indicating a presence of the second field within the DCI.

Aspect 19 is the apparatus of any of aspects 1-18, further includes that the DCI is a last received DCI of a set of DCIs that include the second field and indicate a same slot for transmission of HARQ-ACK information.

Aspect 20 is a method of wireless communication for implementing any of aspects 1-19.

Aspect 21 is an apparatus for wireless communication including means for implementing any of aspects 1-19.

Aspect 22 is a computer-readable medium storing computer executable code, where the code when executed by a processor causes the processor to implement any of aspects 1-19.

What is claimed is:

1. An apparatus for wireless communication at a user equipment (UE), comprising:
at least one memory; and
at least one processor coupled to the at least one memory and, based at least in part on information stored in the at least one memory, the at least one processor, individually or in any combination, is configured to cause the apparatus to:
receive a physical uplink control channel (PUCCH) resource configuration indicating a PUCCH resource repetition configuration for a first PUCCH resource, the PUCCH resource repetition configuration is one of a plurality of repetition configurations associated with a same PUCCH format, wherein the PUCCH resource repetition configuration is defined with respect to the first PUCCH resource such that the same PUCCH format is used with a different number of PUCCH repetitions by using different PUCCH resources;
receive downlink control information (DCI) indicating the first PUCCH resource of a plurality of PUCCH resources; and
transmit a PUCCH in the first PUCCH resource based on the PUCCH resource repetition configuration for the first PUCCH resource and based on the DCI indicating the first PUCCH resource.

2. The apparatus of claim 1, further comprising a transceiver coupled to the at least one processor.

3. The apparatus of claim 1, wherein the PUCCH resource configuration is one of a plurality of PUCCH resource configurations, wherein the plurality of PUCCH resource configurations are associated with the plurality of PUCCH resources.

4. The apparatus of claim 3, wherein the plurality of PUCCH resource configurations are associated with the same PUCCH format.

5. The apparatus of claim 3, wherein the plurality of PUCCH resource configurations comprise at least one of:
a first PUCCH resource configuration comprising a first indication of a first PUCCH resource repetition configuration for the first PUCCH resource of the plurality of PUCCH resources, or
a second PUCCH resource configuration comprising a second indication of a second PUCCH resource repetition configuration for a second PUCCH resource of the plurality of PUCCH resources, the second PUCCH resource repetition configuration different than the first PUCCH resource repetition configuration.

6. The apparatus of claim 1, wherein the at least one processor is configured to receive the PUCCH resource repetition configuration in a PUCCH resource information element (IE) through radio resource control (RRC) signaling or in the DCI.

7. The apparatus of claim 6, wherein the PUCCH resource configuration further configures the first PUCCH resource to be associated with a PUCCH format of a plurality of PUCCH formats.

8. The apparatus of claim 7, wherein the PUCCH format is associated with a PUCCH format repetition configuration, and the PUCCH resource repetition configuration overrides the PUCCH format repetition configuration for the first PUCCH resource.

9. The apparatus of claim 8, wherein the at least one processor is further configured to:
determine a number of PUCCH repetitions for transmission of the PUCCH based on the PUCCH format repetition configuration when the PUCCH resource repetition configuration is unconfigured for a specific number of PUCCH repetitions.

10. The apparatus of claim 8, wherein the at least one processor is further configured to:
determine a number of PUCCH repetitions for transmission of the PUCCH to be one when the PUCCH resource repetition configuration is unconfigured for a specific number of PUCCH repetitions.

11. The apparatus of claim 6, wherein the at least one processor is further configured to:
receive the DCI scheduling a PUCCH transmission, wherein the DCI indicates a PUCCH resource associated with the PUCCH resource configuration that indicates the PUCCH resource repetition configuration.

12. The apparatus of claim 6, wherein the PUCCH resource repetition configuration indicates a first number of PUCCH repetitions, wherein the at least one processor is further configured to:
receive a media access control (MAC) control element (CE) (MAC-CE) that overrides the PUCCH resource repetition configuration, the MAC-CE indicating a second number of PUCCH repetitions for PUCCH transmission, the PUCCH being transmitted based on the received MAC-CE indicating the second number of PUCCH repetitions.

13. The apparatus of claim 6, wherein the at least one processor is further configured to:
receive a media access control (MAC) control element (CE) (MAC-CE) that activates or deactivates the PUCCH resource repetition configuration.

14. The apparatus of claim 13, wherein the PUCCH resource repetition configuration indicates a first number of PUCCH repetitions, wherein the at least one processor is further configured to:
determine a number of PUCCH repetitions for PUCCH transmission to be equal to the first number of PUCCH repetitions when the MAC-CE activates the PUCCH resource repetition configuration; and
determine the number of PUCCH repetitions for the PUCCH transmission to be equal to one when the MAC-CE deactivates the PUCCH resource repetition configuration.

15. The apparatus of claim 13, wherein the at least one processor is further configured to:
determine a number of PUCCH repetitions for PUCCH transmission to be a default number of PUCCH repetitions when the MAC-CE activates the PUCCH resource repetition configuration and the PUCCH resource repetition configuration indicates no repetitions.

16. The apparatus of claim 13, wherein the MAC-CE enables or disables inter-slot frequency hopping associated with a PUCCH resource inter-slot frequency hopping configuration when a number of PUCCH repetitions for PUCCH transmission is greater than one.

17. A method of wireless communication at a user equipment (UE), comprising:
receiving a physical uplink control channel (PUCCH) resource configuration indicating a PUCCH resource repetition configuration for a first PUCCH resource, the PUCCH resource repetition configuration is one of a plurality of repetition configurations associated with a same PUCCH format, wherein the PUCCH resource repetition configuration is defined with respect to the first PUCCH resource such that the same PUCCH format is used with a different number of PUCCH repetitions by using different PUCCH resources;
receiving downlink control information (DCI) indicating the first PUCCH resource of a plurality of PUCCH resources; and
transmitting a PUCCH in the first PUCCH resource based on the PUCCH resource repetition configuration for the first PUCCH resource and based on the DCI indicating the first PUCCH resource.

18. The method of claim 17, wherein the PUCCH resource configuration is one of a plurality of PUCCH resource configurations, wherein the plurality of PUCCH resource configurations are associated with the plurality of PUCCH resources.

19. The method of claim 18, wherein the plurality of PUCCH resource configurations are associated with the same PUCCH format.

20. The method of claim 18, wherein the plurality of PUCCH resource configurations comprise at least one of:
a first PUCCH resource configuration comprising a first indication of a first PUCCH resource repetition configuration for the first PUCCH resource of the plurality of PUCCH resources, or
a second PUCCH resource configuration comprising a second indication of a second PUCCH resource repetition configuration for a second PUCCH resource of the plurality of PUCCH resources, the second PUCCH resource repetition configuration different than the first PUCCH resource repetition configuration.

21. The method of claim 17, further comprising:
receiving the PUCCH resource repetition configuration in a PUCCH resource information element (IE) through radio resource control (RRC) signaling or in the DCI.

22. The method of claim 21, wherein the PUCCH resource configuration further configures the first PUCCH resource to be associated with a PUCCH format of a plurality of PUCCH formats.

23. The method of claim 22, wherein the PUCCH format is associated with a PUCCH format repetition configuration, and the PUCCH resource repetition configuration overrides the PUCCH format repetition configuration for the first PUCCH resource.

24. The method of claim 23, further comprising:
determining a number of PUCCH repetitions for transmission of the PUCCH based on the PUCCH format repetition configuration when the PUCCH resource repetition configuration is unconfigured for a specific number of PUCCH repetitions.

25. The method of claim 23, further comprising:
determining a number of PUCCH repetitions for transmission of the PUCCH to be one when the PUCCH resource repetition configuration is unconfigured for a specific number of PUCCH repetitions.

26. The method of claim 21, further comprising:
receiving the DCI scheduling a PUCCH transmission, wherein the DCI indicates a PUCCH resource associated with the PUCCH resource configuration that indicates the PUCCH resource repetition configuration.

27. The method of claim 21, wherein the PUCCH resource repetition configuration indicates a first number of PUCCH repetitions, the method further comprising:
receiving a media access control (MAC) control element (CE) (MAC-CE) that overrides the PUCCH resource repetition configuration, the MAC-CE indicating a second number of PUCCH repetitions for PUCCH transmission, the PUCCH being transmitted based on the received MAC-CE indicating the second number of PUCCH repetitions.

28. The method of claim 21, further comprising:
receiving a media access control (MAC) control element (CE) (MAC-CE) that activates or deactivates the PUCCH resource repetition configuration.

29. An apparatus for wireless communication at a user equipment (UE), comprising:
means for receiving a physical uplink control channel (PUCCH) resource configuration indicating a PUCCH resource repetition configuration for a first PUCCH resource, the PUCCH resource repetition configuration is one of a plurality of repetition configurations associated with a same PUCCH format, wherein the PUCCH resource repetition configuration is defined with respect to the first PUCCH resource such that the same PUCCH format is used with a different number of PUCCH repetitions by using different PUCCH resources;
means for receiving downlink control information (DCI) indicating the first PUCCH resource of a plurality of PUCCH resources; and
means for transmitting a PUCCH in the first PUCCH resource based on the PUCCH resource repetition configuration for the first PUCCH resource and based on the DCI indicating the first PUCCH resource.

30. A non-transitory computer-readable medium storing computer executable code at a user equipment (UE), the code when executed by at least one processor causes the at least one processor to:
receive a physical uplink control channel (PUCCH) resource configuration indicating a PUCCH resource repetition configuration for a first PUCCH resource, the PUCCH resource repetition configuration is one of a plurality of repetition configurations associated with a same PUCCH format, wherein the PUCCH resource repetition configuration is defined with respect to the first PUCCH resource such that the same PUCCH format is used with a different number of PUCCH repetitions by using different PUCCH resources;
receive downlink control information (DCI) indicating the first PUCCH resource of a plurality of PUCCH resources; and
transmit a PUCCH in the first PUCCH resource based on the PUCCH resource repetition configuration for the first PUCCH resource and based on the DCI indicating the first PUCCH resource.

* * * * *